United States Patent
Patil et al.

(10) Patent No.: US 11,956,313 B2
(45) Date of Patent: *Apr. 9, 2024

(54) DYNAMIC STORAGE SHARING ACROSS NETWORK DEVICES

(71) Applicant: Cisco Technology, Inc., San Jose, CA (US)

(72) Inventors: Santosh Ramrao Patil, Milpitas, CA (US); Ravindra Narayan, Fremont, CA (US); Sanalkumar Thekkanath, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/204,911

(22) Filed: Jun. 1, 2023

(65) Prior Publication Data
US 2023/0308510 A1   Sep. 28, 2023

Related U.S. Application Data

(63) Continuation of application No. 17/683,282, filed on Feb. 28, 2022, now Pat. No. 11,683,375.
(Continued)

(51) Int. Cl.
*H04L 67/06* (2022.01)
*H04L 41/0816* (2022.01)
(Continued)

(52) U.S. Cl.
CPC ...... *H04L 67/1097* (2013.01); *H04L 41/0816* (2013.01); *H04L 41/12* (2013.01);
(Continued)

(58) Field of Classification Search
CPC . H04L 67/1097; H04L 41/0816; H04L 41/12; H04L 47/762; H04L 47/781;
(Continued)

(56) References Cited

U.S. PATENT DOCUMENTS 11,159,389 B1 * 10/2021 Miriyala ............... H04L 41/142
2012/0331059 A1   12/2012 Luna
(Continued)

FOREIGN PATENT DOCUMENTS

CN   111124316   5/2020

OTHER PUBLICATIONS

Office Action for U.S. Appl. No. 17/683,282, dated Jul. 21, 2022, Patil, "Dynamic Storage Sharing Across Network Devices", 7 pages.

*Primary Examiner* — Sm A Rahman
(74) *Attorney, Agent, or Firm* — Lee & Hayes P.C.

(57) ABSTRACT

Techniques and systems described herein relate to shared storage systems across network devices to use unused storage space and provide backup and additional storage for devices as needed. The techniques and systems include determining availability data describing available storage locations and amounts on network devices, compiling such data at a network controller, and communicating the availability data to the network devices. The network devices then directly communicate with each other to store data remotely as needed.

20 Claims, 7 Drawing Sheets

Related U.S. Application Data

(60) Provisional application No. 63/239,000, filed on Aug. 31, 2021.

(51) Int. Cl.
    *H04L 41/12*       (2022.01)
    *H04L 47/762*     (2022.01)
    *H04L 47/78*       (2022.01)
    *H04L 67/1097*    (2022.01)

(52) U.S. Cl.
    CPC .......... *H04L 47/762* (2013.01); *H04L 47/781* (2013.01); *H04L 67/06* (2013.01)

(58) Field of Classification Search
    CPC ....... H04L 67/06; H04L 41/046; H04L 41/40; H04L 41/082; H04L 43/0817
    See application file for complete search history.

(56) References Cited

U.S. PATENT DOCUMENTS

| | | |
|---|---|---|
| 2014/0179312 A1 | 6/2014 | Wynn et al. |
| 2014/0269762 A1 | 9/2014 | Voit et al. |
| 2014/0317293 A1* | 10/2014 | Shatzkamer ........ H04L 41/5054 709/226 |
| 2018/0048584 A1 | 2/2018 | Ra et al. |
| 2018/0316799 A1* | 11/2018 | Shaw .................. H04L 41/0806 |
| 2020/0249972 A1 | 8/2020 | Toy |
| 2020/0314179 A1 | 10/2020 | He et al. |
| 2020/0334209 A1 | 10/2020 | Kilaru et al. |
| 2021/0216530 A1 | 7/2021 | Steinke et al. |
| 2023/0064613 A1 | 3/2023 | Patil |

* cited by examiner

DYNAMIC STORAGE SHARING ACROSS NETWORK DEVICES

RELATED APPLICATIONS

This application is a continuation of and claims priority to U.S. application Ser. No. 17/683,282, filed on Feb. 28, 2022, which claims priority to U.S. Provisional Application No. 63/239,000, filed on Aug. 31, 2021, the entire contents of both which are incorporated herein by reference.

TECHNICAL FIELD

The present disclosure relates generally to network devices and storage of data on network devices.

BACKGROUND

Computer network devices are used in many different environments around the world. Computer network devices are utilized in smart homes, smart buildings, organizations, universities, companies, and countries. The wide distribution of computer networks is a consequence of many factors, and among these is the emerging of the Internet-of-Things (IoT). Network devices are provided with storage, such as on a disk or otherwise, for the purpose of storing data related to images, crash logs, file logs, file storage, telemetry data, and/or other data for storage.

The network devices have limited storage space based on a type of network device, which may also be constrained based on the location of the network devices, for example with space limiting to smaller devices having smaller storage spaces. Additionally, some devices within the network may have large storage amounts while others have small storage amounts based on device type, quality, specifications, requirements, and other such factors.

With limited storage space on network device, crash logs may be limited based on available storage size such that all crash logs may not be stored and some may be lost or deleted. Device telemetry may be impacted in a case of loss of connectivity with a controller due to the limited telemetry data being stored on the network device. Packet capture utilities are limited based on the available storage space and may result in lost or dropped packets. Image downloads for wireless access points and controllers may be limited due to the constraints of storage space and may result in the access point or other network device being unable to store images required by other network devices in the network.

Accordingly, these limitations result in network instability and poor network performance.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
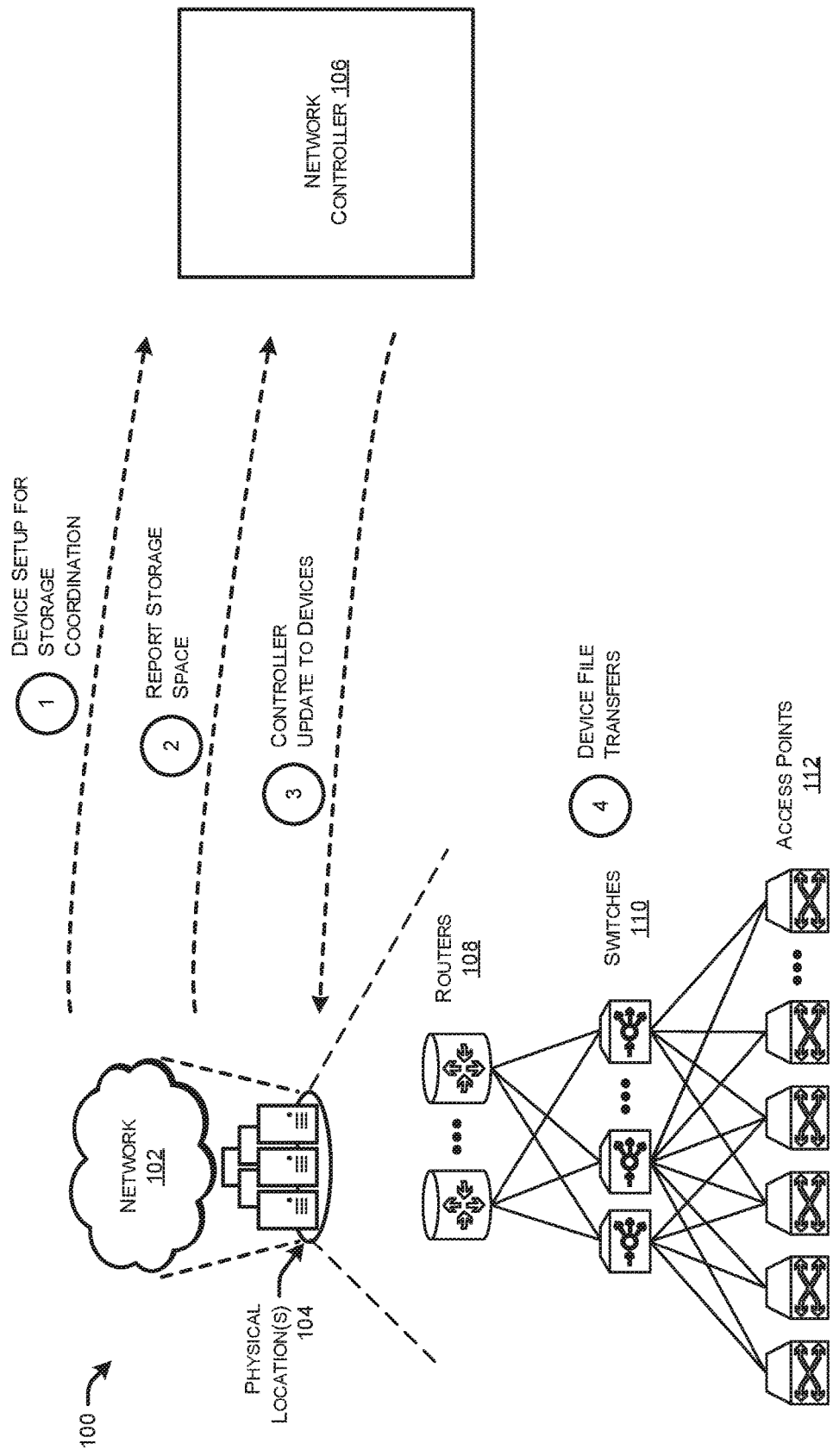
FIG. 1 illustrates an example of a network deployment in which methods and systems for dynamic storage sharing across network devices may be implemented, according to at least some examples.

The present disclosure relates generally to generally to storage sharing among devices within the same network and/or location and more particularly to real-time dynamic storage sharing across network devices to coordinate efficient use of storage space within the network.

A method as described herein may include receiving, at a software-defined networking (SDN) controller of a network, availability indications from one or more devices in communication over the network. The availability indications may describe a total storage space as well as an unoccupied or unreserved space available for storage sharing with other network devices. The controller may generate storage data for the network describing locations and storage amounts available at each location (e.g., network device) where other network devices may convey data for storage. Each of the network devices participating in the storage sharing system receives the storage data and may participate by receiving data for storage as well as conveying data for storage at the indicated locations. In some examples the shared storage system may be periodically updated such that the availability of storage at each network device is up to date and propagated across the network at regular intervals. In some examples, the shared storage system may include storage accessible only through use of credentials that may be shared via the controller such that the controller enables devices to store data on network devices that require credentials for access. In some examples the availability data may also include descriptions of file transfer protocols associated with particular network devices such that network devices may communicate data to network devices configured for identical file transfer protocols. In some examples, the shared storage system may include a network topology maintained at the controller that enables network devices to share storage space and prioritize storage at network devices located physically nearest, to reduce transit of data over greater distances, and ensure rapid and consistent access to the stored data.

Additionally, the techniques of the method, and any other techniques described herein, may be performed by a system and/or device having non-transitory computer-readable media storing computer-executable instructions that, when executed by one or more processors, performs the method(s) described above.

Example Embodiments

This disclosure describes techniques for dynamic storage sharing across network devices. The network devices are in network communication with one another and may be physically located in a physical region adjacent one another. In order to coordinate the shared storage space usage across network devices, a component of the network devices (e.g., an agent) may coordinate among the network devices as well as communicate with the network controller. In some examples, the agent may include a plug and play (PnP) agent present on the network devices that is activated when the network device is powered on, the PnP agent performing device onboarding with the SDN controller. The PnP agent may me configured to coordinate the shared storage system amongst the network devices and the SDN controller.

The techniques for dynamic storage sharing includes initial network device configuration to enable storage coordination across devices. During an initial onboard process for a network device, or as part of a later enrollment phase, a PnP agent or other onboarding and/or enrollment agent communicates with the SDN controller. The communication includes enrollment, partial enrollment, or exemption from the storage sharing system. Additional information includes storage capacity available on the network device and file transfer protocols for the network device. In some examples the network device may share only a portion of the storage space available, such as only offering an optional twenty-five percent of total storage capacity for storage sharing, thereby permanently reserving seventy-five percent of storage for on-device storage. In some examples the network device may be configured to share all available storage space on the device, or other partitions or portions of the storage space. The communication with the controller may also include credentials required to access and/or store information on the storage space of the network device, for example to provide access to read and/or write within the designated portion of the storage space on the network device. As part of the onboarding process, the network topology may be established that includes the physical locations of network devices relative to one another.

After initial onboarding with the SDN controller and PnP agent, the storage system may continue to communicate with the SDN controller via the PnP agent, or another component of the network device. The continued communication may include reporting storage space on the network device. The storage space may be reported to include the available space for shared storage as well as other information including the credentials, total space on the network device, and other such information. The SDN controller may periodically request and/or receive updates on the shared storage space available on each network device and may maintain such information as well as sharing updates across the network to provide dynamic and real-time shared storage updates to network devices within the network that may be used for continued storage decisions (e.g., store on device or store remotely).

The SDN controller periodically conveys updates to the network devices within the network indicating the locations and amounts of storage space available for the shared storage system. The updates across the network may update information related to the network topology (e.g., new or removed network devices) as well as updates to storage space availability and credentials to access the same and the file transfer protocols associated with each. The updates may be communicated from the SDN controller to the PnP agent or another component of the network device. Extension of the functionality of the PnP agent may enable network devices to function as originally configured without additional components and merely providing continual functionality to a PnP agent that may initially include components for initial onboarding of devices. Such communications may be shared over the PnP protocols with the SDN controller using established and reliable communication channels and protocols.

As network devices receive updates and information relating to available shared storage space, network topology, file transfer protocols, etc., components of the network devices (e.g., the PnP agent and/or a shared storage component) perform file transfers and file retrievals as needed by the network device. The network device may include a log indicating locations of files stored by the network device within the shared storage system as well as other pertinent information relating to storing and accessing such data from the locations within the shared system. The network device may convey updates on file transfers, file storage, file access, file deletion, and other actions relating to data within the shared storage system with the SDN controller. The SDN controller may also maintain a log of locations for data stored within the network and other such data relating to transfers and accesses of the data. The SDN controller log may perform an audit role, for example to provide a redundant storage of data stored on remote devices in case of log deletion or corruption on the network device itself. In some examples, the log of data stored within the shared storage system may be propagated through the network devices as part of the updates on availability to provide redundancy and ensure file and data security through the use of multiple copies of updated file transfer logs. In some examples, policies for handling of data may be based on network device policies or, in some examples, may be universal system-wide policies describing file handling procedures and may be defined during an onboarding phase.

Although the techniques described herein are primarily with respect to authentications performed by an authentication platform, the techniques are equally applicable across any industry, technology, environment, etc.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example of a network deployment in which methods and systems for dynamic storage sharing across network devices may be implemented, according to at least some examples. The environment 100 includes a network architecture 102 that may include one or more physical locations 104 such as data centers or other locations where a network may be implemented. FIG. 1 further illustrates a network controller 106 in the network environment 100 deploying the shared storage function across network devices within the network architecture 102.

In some examples, the network architecture 102 may include devices housed or located in one or more physical locations 104. The network architecture 102 may include one or more networks implemented by any viable communication technology, such as wired and/or wireless modalities and/or technologies. The network architecture 102 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The network architecture 102 may include devices, virtual resources, or other nodes that relay packets from one network segment to another by nodes in the computer network. The network architecture 102 may include multiple devices that utilize the network layer (and/or session layer, transport layer, etc.) in the OSI model for packet forwarding, and/or other layers. The network architecture 102 may include various hardware devices, such as routers, switches, gateways, smart NICs, NICs, ASICs, FPGAs, servers, and/or any other type of device. Further, the network architecture 102 may include virtual resources, such as VMs, containers, and/or other virtual resources.

The one or more physical locations 104 may be physical facilities or buildings located across geographic areas that designated to store networked devices that are part of the network architecture 102. The physical locations 104 may include various networking devices, as well as redundant or backup components and infrastructure for power supply, data communications connections, environmental controls, and various security devices. In some examples, the physical locations 104 may include one or more virtual data centers which are a pool or collection of cloud infrastructure resources specifically designed for enterprise needs, and/or for cloud-based service provider needs. Generally, the physical locations 104 (physical and/or virtual) may provide basic resources such as processor (CPU), memory (RAM), storage (disk), and networking (bandwidth). However, in some examples the devices in the network architecture 102 may not be located in explicitly defined physical locations 104, but may be located in other locations or buildings.

The environment 100 illustrates the network controller 106 that may be implemented to configure a shared storage system across network devices within the network architecture 102 as discussed herein. Generally, the network architecture 102 may include various network devices and components, such as routers 108, switches 110, access points 112, and/or other network components. Although not illustrated, the network architecture may additionally, or alternatively, include gateways, NICs and smartNICs, FPGAs, ASICs, virtual machines, containers, and/or any other type of hardware-based or software-based network component.

At "1," a component of the network devices within the network architecture 102 performs device setup for storage configuration. As discussed with respect to FIG. 2, the component may include a setup component, a PnP agent, a shared storage component, or other component of the network devices configured to communicate with the network controller 106. The initial device setup for storage coordination includes initial network device configuration to enable storage coordination across devices. During an initial onboard process for a network device, or as part of a later enrollment phase, a PnP agent or other onboarding and/or enrollment agent communicates with the network controller 106, which may include an SDN controller as described above. The communication includes enrollment, partial enrollment, or exemption from the storage sharing system. Additional information includes storage capacity available on the network device and file transfer protocols for the network device. In some examples the network device may share only a portion of the storage space available, such as only offering an optional twenty-five percent of total storage capacity for storage sharing, thereby permanently reserving seventy-five percent of storage for on-device storage. In some examples the network device may be configured to share all available storage space on the device, or other partitions or portions of the storage space. The communication with the controller may also include credentials required to access and/or store information on the storage space of the network device, for example to provide access to read and/or write within the designated portion of the storage space on the network device. As part of the onboarding process, the network topology may be established that includes the physical locations of network devices relative to one another within the network architecture 102.

At "2," the network devices within the network architecture 102 reports storage space to the network controller 106. The storage space may include the total storage space available on the particular network device, a percent of total storage allocated for shared storage, an explicit amount of storage data available for sharing, or other such indication of an amount of available space for shared data storage. The storage space may be reported to include the available space for shared storage as well as other information including the credentials, total space on the network device, file transfer protocols, and other such information. The network controller 106 may periodically request and/or receive updates on the shared storage space available on each network device and may maintain such information as well as sharing updates across the network architecture 102 to provide dynamic and real-time shared storage updates to network devices within the network architecture 102 that may be used for continued storage decisions (e.g., store on device or store remotely).

At "3," the network controller 106 periodically conveys updates to the network devices within the network architecture 102 indicating the locations (e.g., network device identities) and amounts of storage space available for the shared storage system. The updates across the network architecture 102 may update information related to the network topology (e.g., new or removed network devices) as well as updates to storage space availability, credentials to access in the shared storage locations, and the file transfer protocols associated with each. The updates may be communicated from the network controller 106 to the network devices via a communication device, such as a PnP agent or another component of the network device.

At "4," the network devices perform file transfers among each other. As network devices receive updates and information relating to available shared storage space, network topology, file transfer protocols, etc., components of the network devices (e.g., the PnP agent and/or a shared storage component) perform file transfers and file retrievals as needed by the network devices. The network devices may include a log indicating locations of files stored by the network devices within the shared storage system as well as other pertinent information relating to storing and accessing such data from the locations within the shared system. The network device may convey updates on file transfers, file storage, file access, file deletion, and other actions relating to data within the shared storage system with the network controller 106. The network controller 106 may also maintain a log of locations for data stored within the network and other such data relating to transfers and accesses of the data. The network controller 106 log may perform an audit role, for example to provide a redundant storage of data stored on remote devices in case of log deletion or corruption on the network device itself. In some examples, the log of data stored within the shared storage system may be propagated through the network devices as part of the updates on availability to provide redundancy and ensure file and data security through the use of multiple copies of updated file transfer logs. In some examples, policies for handling of data may be based on network device policies or, in some examples, may be universal system-wide policies describing file handling procedures and may be defined during an onboarding phase.

Figure 2:
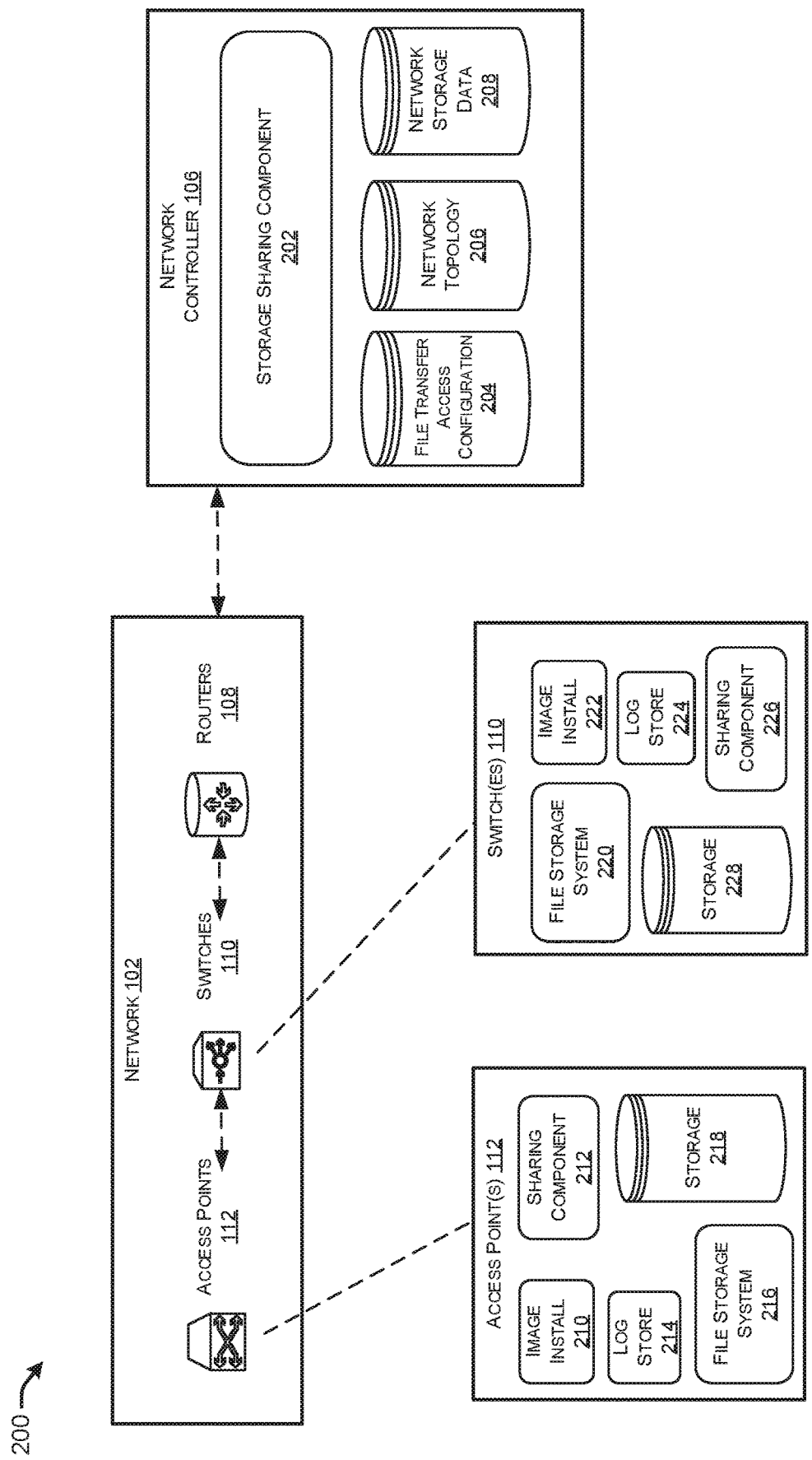
FIG. 2 illustrates a system architecture of a network deployment for dynamic storage sharing across network devices, according to at least some examples.

FIG. 2 illustrates a system architecture 200 of a network deployment for dynamic storage sharing across network devices, according to at least some examples. The system architecture 200 includes the network architecture 102 with routers 108, switches 110, access points 112, and other network devices in communication through the network architecture 102. The system architecture also includes the network controller 106 as described above with respect to FIG. 1.

The switches 110, access points 112, and in some cases routers 108 may each include various components including image install components 210 and 222, sharing components 212 and 226, log store components 214 and 224, file storage system 216 and 226, and storage 218 and 228. The image install components 210 and 222 may be configured for storing of images for acting as a wireless controller or other operations. The sharing components 212 and 226 may be configured for communicating with the network controller 106 and the network devices, for example to store or access data stored on other network devices. The log store components 214 and 224 may be configured to store logs of data storage locations, contents, credentials, accesses, and the like. The file storage systems 216 and 226 may be systems for handling storage of data within the storage databases 218 and 228.

The network controller 106 includes the storage sharing component 202 that may include a PnP agent, or a purpose-built component configured to receive updates from the network devices as well as communicate updates to each of the network devices as the shared storage system is used. The network controller 106 also includes file transfer access configurations 204 that may describe credentials, file transfer protocols, and other such data related to transferring data between network devices. The network topology 206 describes the physical layout of the network architecture 102 and may be used to prioritize storage of data in shared storage of network devices physically near the origin network device. The physical proximity may reduce transfer times, access times, and reduce risks of connection issues between the devices, thereby increasing the robustness of the shared storage system. In such examples, the availability data provided to each network device may be personalized for each network device based on their proximity to other network devices, prioritizing physically nearby storage locations over more remote storage locations. The network controller 106 also includes network storage data 208 that may describe the locations, identities, sources, and types of data stored within the shared storage system. In some examples the network storage data 208 may provide an audit log or backup in event of a device reset or failure such that stored data may be identified even though located on physically separate devices.

During an initial network device setup phase, for example when setting up the access points 112, switches, 110 and routers 108 within the network architecture, a sharing component 212 or 226 communicates with the storage sharing component 202 of the network controller 106. In some examples these may include PnP agents or may be purpose-built components configured for the shared storage architecture. The communication with the storage sharing component 202 may indicate availability of the network device to participate in the shared storage system, the amount of storage available for sharing, file transfer protocols, credentials, and other such information.

The network controller 106, and specifically the storage sharing component 202 receives the information from the network devices and provides each of the network devices with setup configurations for shared storage. Such information may include credentials for a shared storage partition, shared file transfer protocols, shared file folder names to be created, file naming protocols, file logging and tracking, and the like.

During use, and following an initial setup phase, the sharing components 212 and 226 update the storage sharing component 202 with real-time or near real-time information describing changes in the available storage space on the network devices. Additional updates may include changes to topology within the network architecture 102, credentials, file transfer protocols, or other relevant data.

Further, during use, the network controller 106 periodically updates the network devices with information describing the available storage space, locations, credentials, file transfer protocols, and the like. Such updates may be provided on a regular periodic schedule in some examples, or may be provided when new data is gained or changed, with updated pushed to each of the network devices as the availability, topology, credentials, or other such data changes within the network architecture 102.

At the network devices, the sharing components 212 and 226 includes the latest information describing available shared storage space and file transfer-related information. When the file storage systems 216 and 220 need to store data due to a function of the network device, the file storage systems 216 and 220 and/or the sharing components 212 and 226 may first check the local storage of the network device for sufficient availability. In the event that local available space may be insufficient, or that a remaining local storage amount following storage of the data locally would be below a threshold amount (e.g., a storage buffer to ensure the local storage is never completely filled), then the file storage systems 216 and 220 and/or the sharing components 212 and 226 may identify available storage within the shared storage of the network architecture 102. The available storage may be identified based on availability of space, for example identifying a single or the least number of locations where the data may be stored (e.g., dividing the data into the smallest possible groups for storage). The available storage may also be identified based on the network topology, prioritizing physically nearby storage locations. The available storage may also be identified based on security or file transfer protocols meeting or in some cases exceeding standards associated with the originating network device. In some cases, the network device may decide whether to store data locally based on a rating, such as a security or criticality rating of the data. Data critical to vital operations may be prioritized for local storage over lower priority data.

The network device maintains a log of data stored on external devices and ensures that such data is timely removed and deleted or returned to the network device when possible. In this manner, local storage may be preferred over remote storage in the shared storage system. In the event that a network device has urgent need for local storage that is occupied by shared storage data, then the shared data may be overwritten to make room for the urgent data. In such examples, the network controller 106 may identify the overwrite and update throughout the network architecture 102 indicating the overwrite based on the data within the network storage data 208, which may act as audit data.

Figure 3:
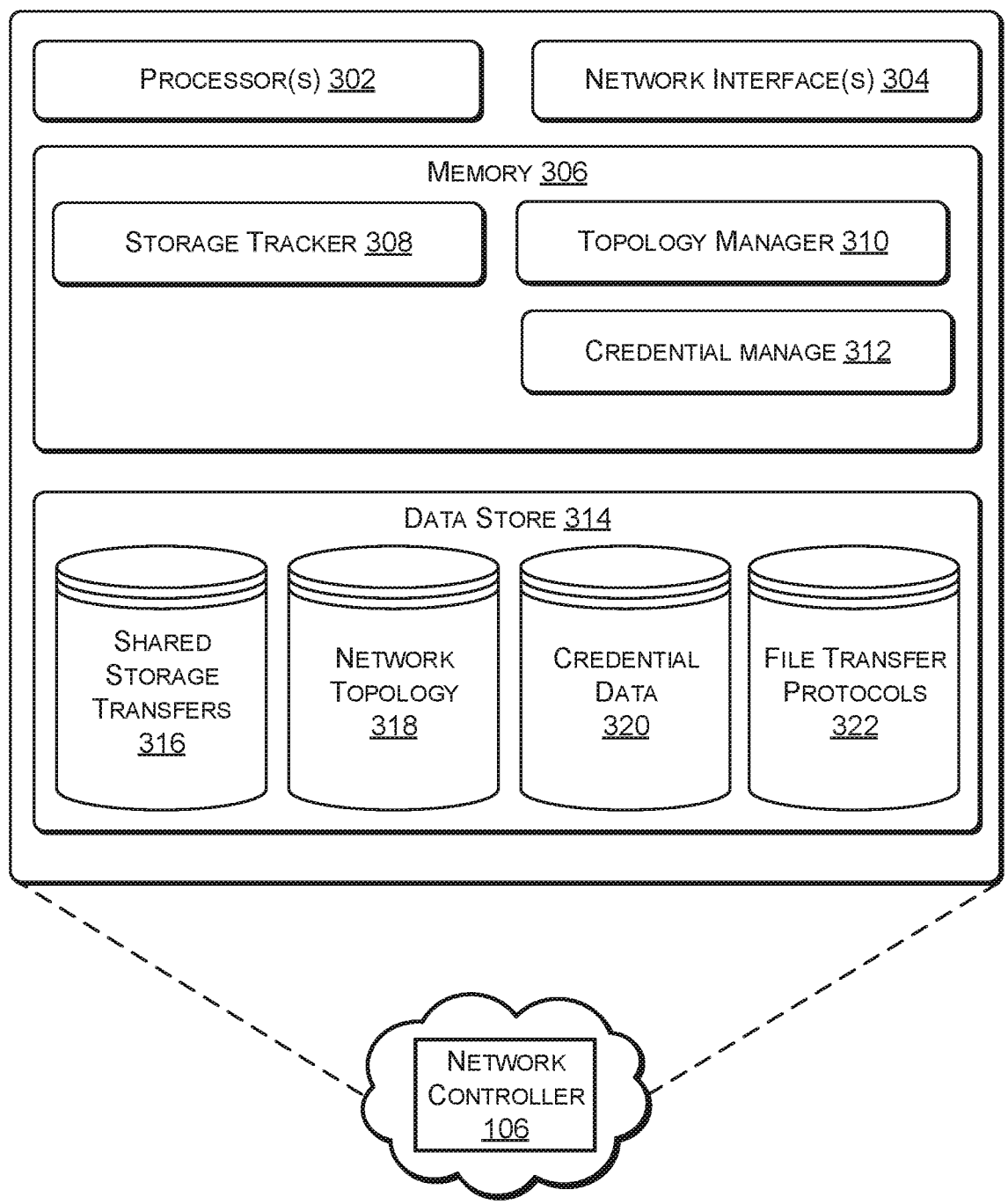
FIG. 3 illustrates an example of a network controller that may implement dynamic storage sharing across network devices, according to at least some examples.

FIG. 3 illustrates an example of a network controller 106 that may implement dynamic storage sharing across network devices within a network architecture, such as network architecture 102, according to at least some examples. In some instances, the network controller 106 may run on one or more computing devices in, or associated with, the network architecture 102 (e.g., a single device or a system of devices). The network controller 106 may comprise a single controller that is running, or multiple instances of a network controller 106 running at least partly at a same time.

Generally, the network controller 106 may be a programmable controller that manages some or all of the control plane activities of the network architecture 102, and manages or monitors the network state using one or more centralized control models. Generally, the network controller 106 may handle at least the functions of (i) receiving network device storage availability data, (ii) determining storage availability and locations, and (iii) propagating storage availability to network devices.

As illustrated, the network controller 106 may include, or run on, one or more hardware processors 302 (processors), one or more devices, configured to execute one or more stored instructions. The processor(s) 302 may comprise one or more cores. Further, the network controller 106 may include or be associated with (e.g., communicatively coupled to) one or more network interfaces 304 configured to provide communications with the user device 106 and other devices, and/or other systems or devices in the network architecture 102 and/or remote from the network architecture 102. The network interfaces 304 may include devices configured to couple to personal area networks (PANs), wired and wireless local area networks (LANs), wired and wireless wide area networks (WANs), and so forth. For example, the network interfaces 304 may include devices compatible with any networking protocol The network controller 106 may also include memory 306, such as computer-readable media, that stores various executable components (e.g., software-based components, firmware-based components, etc.). The memory 306 may generally store components to implement functionality described herein as being performed by the network controller 106. The memory 306 may store one or more network service functions such as a topology manager 310 to manage a topology of the network architecture 102, a storage tracker 308 to track what network components are storing data within their shared storage, a credential manager 312, and/or any other type of function performed by the network controller 106.

The network controller 106 may further include a data store 314, such as long-term storage, that stores shared storage transfers 316 describing transfers of data between network devices as part of the shared storage system. Additionally, the data store 314 may include network topology data 318, such as a model representing the layout of the network components in the network architecture 102 including their physical locations relative to one another. The data store 314 may store credential data 320 that indicates computing resource usage and/or availability on the different network components in the network architecture 102. Additionally, the data store 314 may store file transfer protocols 322 describing different file transfer protocols associated with the different network devices of the network architecture 102.

Figure 4:
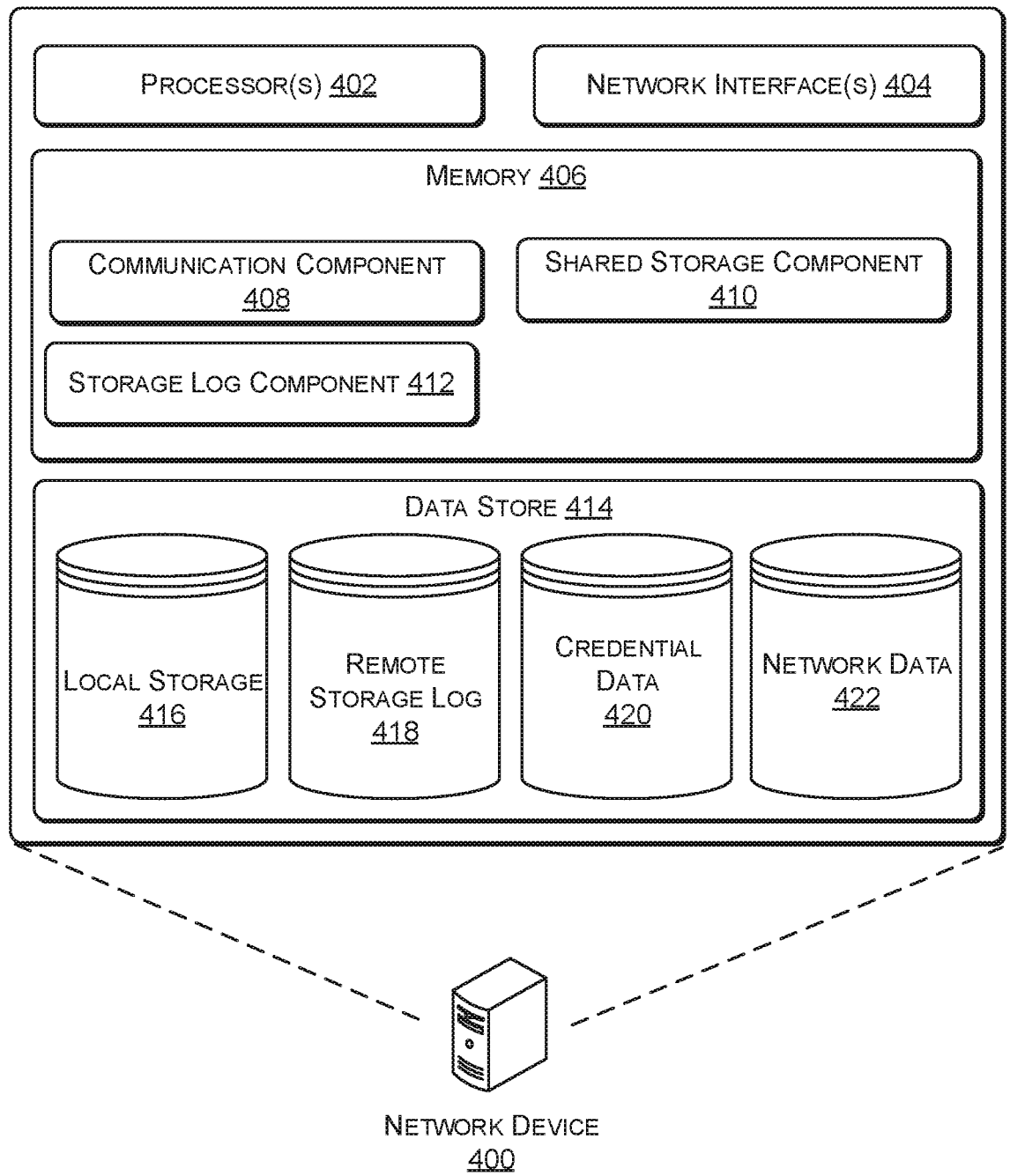
FIG. 4 illustrates an example of a network device that may participate in dynamic storage sharing, according to at least some examples.

FIG. 4 illustrates a component diagram of an example network device 400 (e.g., routers 108, switches 110, and access points 112) that may participate in the shared storage system described herein. The network device 400 may include any type of computing device capable of communicating over network architecture 102 and including storage and computing components.

As illustrated, the network device 400 may include one or more hardware processors 402 (processors), one or more devices, configured to execute one or more stored instructions. The processor(s) 402 may comprise one or more cores. Further, the network device 400 may include one or more network interfaces 404 configured to provide communications between the network device 400 and other devices, such as the network controller 106, and/or other systems or devices in the network architecture 102 and/or remote from the network architecture 102. The network interfaces 404 may include devices configured to couple to personal area networks (PANs), wired and wireless local area networks (LANs), wired and wireless wide area networks (WANs), and so forth. For example, the network interfaces 404 may include devices compatible with Ethernet, Wi-Fi, and so forth.

The network device 400 may also include memory 406, such as computer-readable media, that stores various executable components (e.g., software-based components, firmware-based components, etc.). The memory 406 may generally store components to implement functionality described herein. The memory 406 may store a communication component 408 that comprises software (e.g., any protocol stack) to enable the network device 400 to communicate with other devices using the network interface 404. The memory 406 may also include a shared storage component 410 and a storage log component 412.

The shared storage component 410 may include one or more subcomponents to determine available storage space within the network device 400, track data locations stored on other network devices, access and store data in remote locations on other network devices, and provide information and updates to the network controller 106 as described herein.

The storage log component 412 may store a log of data and files stored locally on the network device 400 as well as those stored by the network device 400 on other network devices within the network architecture 102.

The user device 106 may further include a data store 414, which may comprise any type of computer memory including long-term memory (e.g., Read Only Memory (ROM), Random Access Memory (RAM), caches, etc.). The data store 414 may include a local storage database 416 that includes items stored locally within the network device 400, a remote storage log 418 that tracks and logs data and files stored on other network devices, credential data 420 that includes credentials for the network device 400 to access other network devices as well as the credentials of the network device 400 that must be entered by other devices trying to access data store 414, and network data 422 that may include data propagated by the network controller 106 including available storage within the network architecture 102, network topology, network credentials, and other such data.

Figure 5:
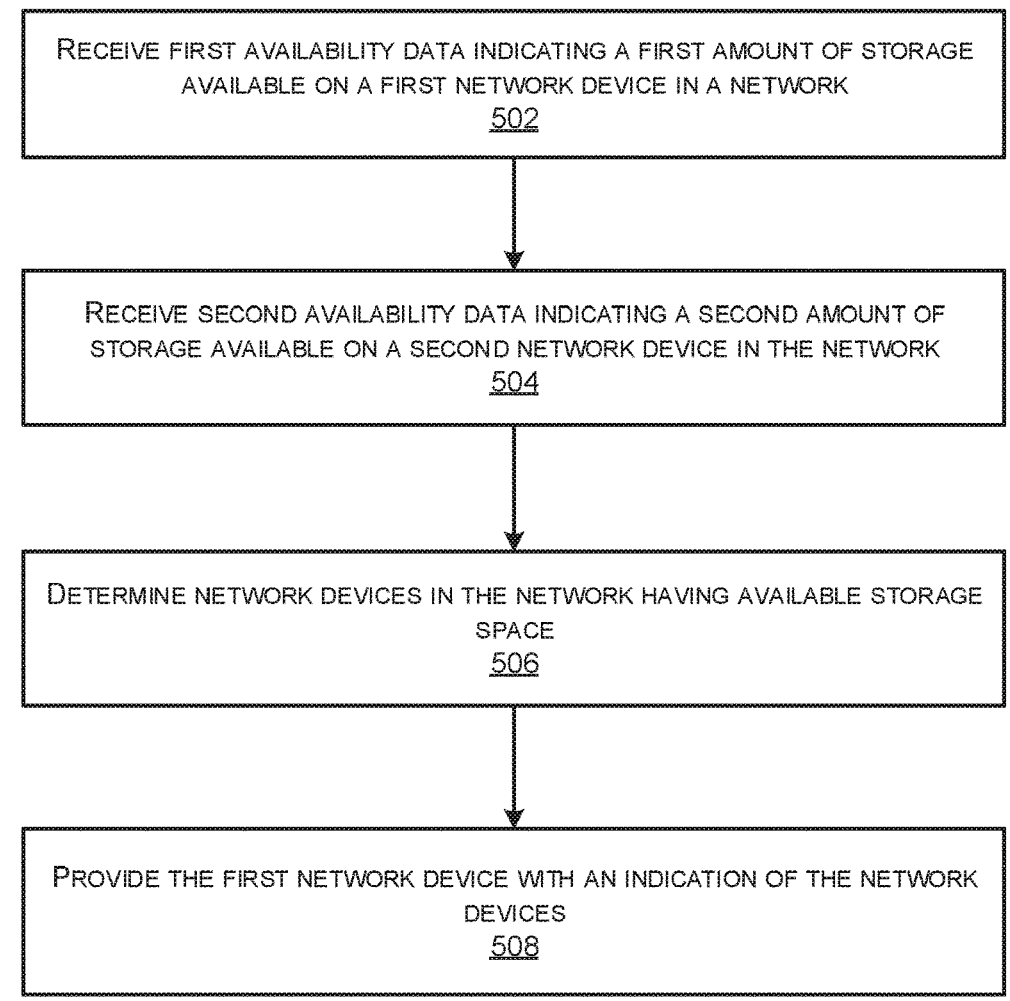
FIG. 5 illustrates a flow diagram of a process for a network controller to manage dynamic storage sharing across network devices, according to at least some examples.

FIG. 5 illustrates a flow diagram of a process 500 for a network controller to manage dynamic storage sharing across network devices, according to at least some examples. In some examples, the steps depicted may be implemented in software executed by a processor, such as a processor of a network controller 106, a processor of a network device, or other computing device or combination thereof. Though the logical flow diagrams included herein are shown in a particular order, the order of the processes may be different in some examples. The process 500 as well as each other process described herein, may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation. In addition, some or all of the process 500 may be performed locally on the carts as described herein, and some or all of the processes may be performed at a remote computing system, such as a cloud computing system with which the carts are in network communication.

At 502, the process 500 includes the network controller 106 receiving first availability data indicating a first amount of storage available on a first network device in a network. In some examples the first network device may be a network device such as an access point, a switch, a router, or other such device. The availability data may be provided by the first network device in response to a request from the network controller 106. In some examples the availability data may be provided to the network controller 106 as part of a setup or onboarding process for the first network device as it is set up and connected to the network. The first availability data may describe storage space available for use by other network devices within the network and may include a portion or an entirety of the storage space on the first network device. The network controller 106 may also receive credentials for accessing the storage space of the first network device. The network controller 106 may also receive network topology data, indicating a physical layout of the network devices that may be used to identify a location of the first network device as well as to identify other network devices adjacent and nearby the first network device. In some examples, the first availability data may be periodically updated by receiving updated availability data and updated other data from the first network device at the network controller 106. The updated data may be used to update a dataset at the network controller, and in some instances may overwrite the first availability data from a previous periodic update.

At 504, the process 500 includes the network controller receiving second availability data indicating a second amount of storage available on a second network device in the network. The data received from the second network device may be similar to the first availability data, in that it may describe available storage space, network topology location, credentials, and the like. The second network device may be one of a plurality of additional network devices within the network. As with the first network device, the second availability data may also be periodically updated at the network controller. For each of the first availability data and the second availability data, the updates may be provided at set regular intervals, for example at a span of a few second, a few minutes, a few hours, etc., or may be provided to the network controller when there is a change in the availability data, with the change communicated to the network controller 106.

At 506, the process 500 includes determining network devices in the network having available storage space. The network controller 106 may determine a listing or dataset describing network devices within the network as well as real-time or near real-time available storage space at each network device. The dataset may further be organized based on file transfer protocols for the different network devices as well as by network topology. In the instance of file transfer protocols, the dataset may be organized to group network devices having similar file transfer protocols together. Additionally, the dataset may be organized such that network devices are identifiable based on adjacent network devices and their location within the network topology. The network topology may be used to generate regions or groupings of network devices physically located near one another. In some examples the regions may be defined as a region for each network device and include the network devices physically closest, for example within a threshold distance, to the target network device.

At 508, the process 500 includes providing the first network device with an indication of the network devices having availability. The indication may also include information such as the file transfer protocol type, credentials for providing access, and a ranking or prioritization for each network device based on a physical distance from the first network device that is determined based on the network topology.

In some examples, the first network device may then communicate with one or more other network devices to store and access data within the available storage space of the remote network devices based on the indication received from the network controller. The first network device may identify a storage location based on a size of available space being greater than the space needed for particular data, for example with the available space at the destination exceeding the estimated data size by a certain threshold amount. The first network device may filter and prioritize network devices based on physical proximity (e.g., from the network topology), file transfer protocols, security protocols, and other such factors. In some examples, the first network device may generate a ranked list of preferred locations based on one or more such factors by generating a score for each location based on the plurality of factors and ultimately selecting a location based on the highest score from the factors. The network devices may thereby share available storage space for temporary and/or permanent storage of information. The logs of data storage may be recorded both at the network controller and locally on the network devices to provide redundancy in the event of a network device or network failure.

Figure 6:
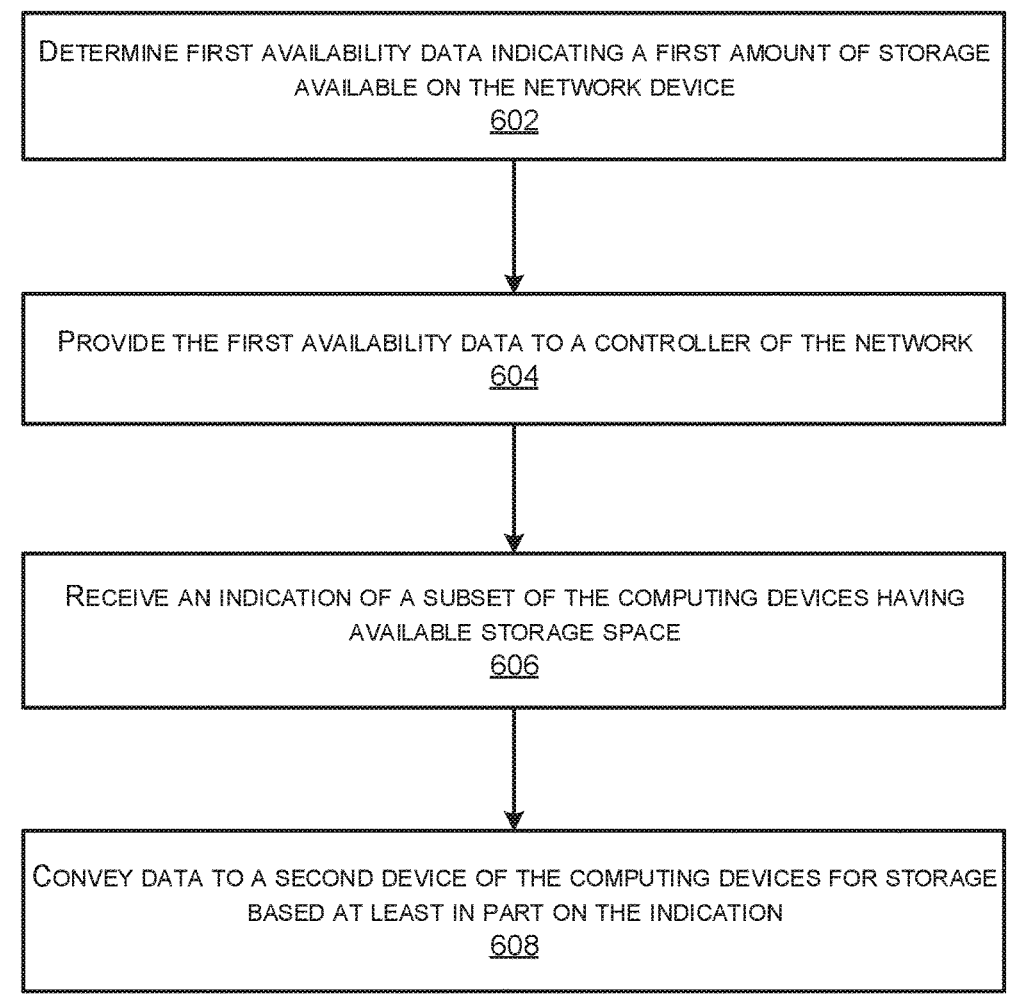
FIG. 6 illustrates a flow diagram of a process for a network device to participate in dynamic storage sharing, according to at least some examples.

FIG. 6 illustrates a flow diagram of a process 600 for a network device to participate in dynamic storage sharing, according to at least some examples.

At 602, the process 600 includes determining, by a network device, first availability data indicating a first amount of storage available on the network device. As described herein, the available storage space may include an entirety of an unoccupied storage device, or may include only a reserved portion of the unoccupied storage space that is reserved for shared storage, while reserving a working amount of storage based on expected storage capacity for the network device. The expected storage capacity determined based at least in part on historical data storage on the local device, expected data storage needs, modeling, or other such sources.

At 604, the process 600 includes providing the first availability data to a network controller associated with a network that the network device is communicatively coupled with. The first availability data may be provided including the amount of storage space, a timestamp of the first availability data, credentials for accessing the available storage, network device location, and other such data. The first availability data may be updated and provided at regular intervals to the network controller 106 or may be provided whenever a change to the first availability data is determined.

At 606, the process 600 includes receiving an indication of a subset of the computing devices communicatively coupled with the network having available storage space. The indication may include availability data, such as the first availability data from a plurality of different computing devices and may include location, storage amount, credentials, and other such data as described herein. The indication may include a subset of the computing devices as some computing devices may not participate in the storage sharing, and others may not have available space to accept storage of data.

At 608, the process 600 includes conveying data to a second device of the computing devices for storage based at least in part on the indication. The second device may be selected based on proximity, available storage space, file transfer protocol, security protocol, and other such factors. In some examples a trained model may determine a score based on these and other factors with a location for storage selected based on selecting a highest score. The first network device may communicate the data for storage at the second device and store a log of the location, type of data, size of data, credentials to access the data, and other such information related to storing the data at the second device. In some examples, the first network device may communicate data describing the remote stored data to the network controller for storage in a log of shared data. The network devices may communicate directly with one another by using the availability data without having to transmit the shared data through a hub, such as through the network controller. Avoiding the routing through a hub ensure quick transfer of direct data and less possibilities for dropped or lost data packets.

Figure 7:
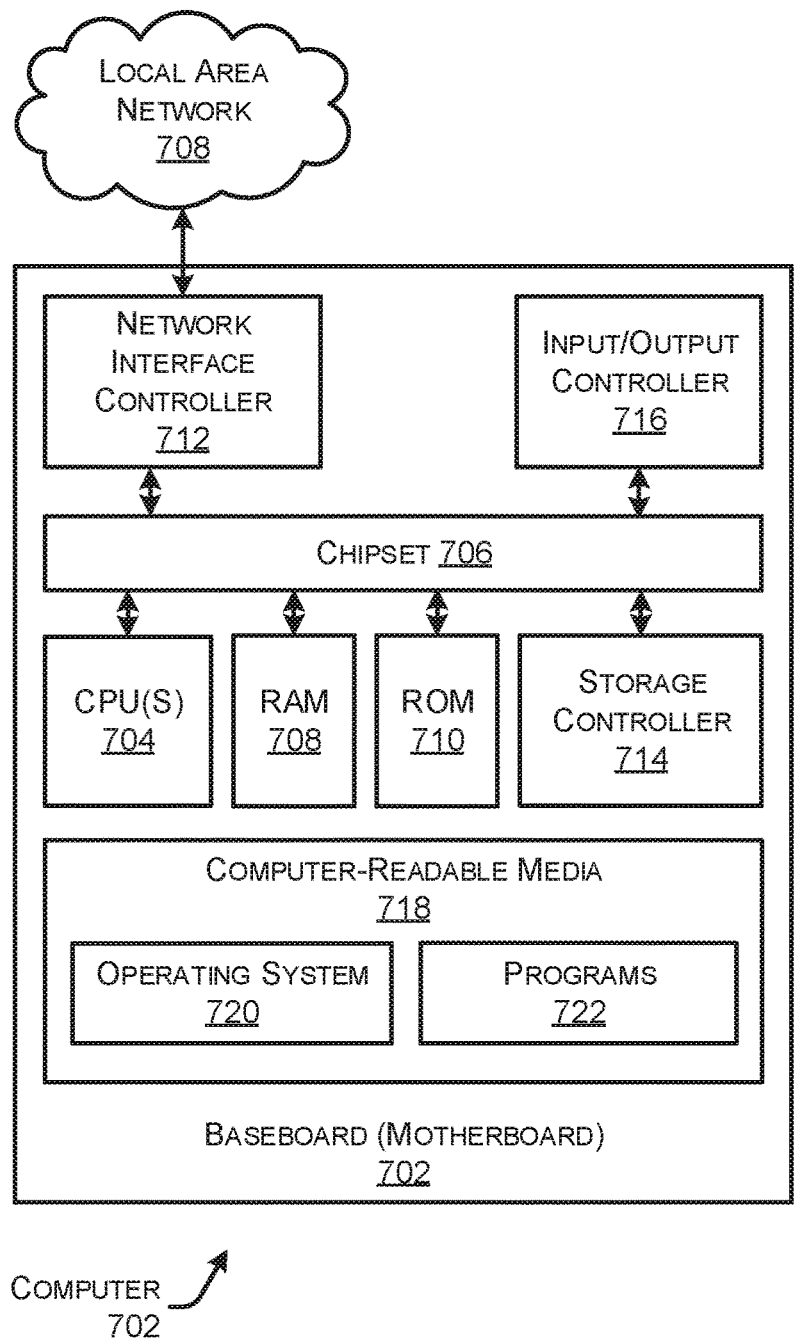
FIG. 7 is a computer architecture diagram showing an illustrative computer hardware architecture for implementing a computing device that can be utilized to implement aspects of the various technologies presented herein.

FIG. 7 is an architecture diagram for a computer 700 showing an illustrative computer hardware architecture for implementing a computing device that can be utilized to implement aspects of the various technologies presented herein. The computer architecture shown in FIG. 7 illustrates a conventional server computer, workstation, desktop computer, laptop, tablet, network appliance, e-reader, smartphone, or other computing device, and can be utilized to execute any of the software components presented herein. In some examples, the computer 700 may be part of a system of computers, such as the network architecture 102, network controller 106, network devices, or other such devices described herein. In some instances, the computer 700 may be included in a system of devices that perform the operations described herein.

The computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage media 718 such as a read-only memory ("ROM") 710 or non-volatile RAM ("NVRAM") for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network, such as the network architecture 102. The chipset 706 can include functionality for providing network connectivity through a network interface controller (NIC) 712, such as a gigabit Ethernet adapter. The NIC 712 is capable of connecting the computer 700 to other computing devices over the network architecture 102. It should be appreciated that multiple NICs 712 can be present in the computer 700, connecting the computer to other types of networks and remote computer systems.

The computer 700 can include storage 714 (e.g., disk) that provides non-volatile storage for the computer. The storage 714 can consist of one or more physical storage units. The storage 714 can store information by altering the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the storage 714 by detecting the physical states or characteristics of one or more particular locations within the physical storage units.

In addition to the storage 714 described above, the computer 700 can have access to other computer-readable storage media 718 to store and retrieve information, such as programs 722, operating system 720, data structures, or other data. It should be appreciated by those skilled in the art that computer-readable storage media 718 is any available media that provides for the non-transitory storage of data and that can be accessed by the computer 700. Some or all of the operations performed by any components included therein, may be performed by one or more computer(s) 700 operating in a network-based arrangement.

By way of example, and not limitation, computer-readable storage media 718 can include volatile and non-volatile, removable and non-removable media implemented in any method or technology. Computer-readable storage media 718 includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The computer-readable storage media 718 can store an operating system 720 utilized to control the operation of the computer 700. According to one embodiment, the operating system comprises the LINUX operating system. According to another embodiment, the operating system comprises the WINDOWS SERVER operating system from MICROSOFT Corporation of Redmond, Washington. According to further embodiments, the operating system can comprise the UNIX operating system or one of its variants. It should be appreciated that other operating systems can also be utilized. The computer-readable storage media 718 can store other system or programs 722 and data utilized by the computer 700.

In one embodiment, the computer-readable storage media 718, storage 714, RAM 708, ROM 710, and/or other computer-readable storage media may be encoded with computer-executable instructions which, when loaded into the computer 700, transform the computer from a general-purpose computing system into a special-purpose computer capable of implementing the embodiments described herein. These computer-executable instructions transform the computer 700 by specifying how the CPUs 704 transition between states, as described above. According to one embodiment, the computer 700 has access to computer-readable storage media storing computer-executable instructions which, when executed by the computer 700, perform the various techniques described above. The computer 700 can also include computer-readable storage media having instructions stored thereupon for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 700 might not include all of the components shown in FIG. 7, can include other components that are not explicitly shown in FIG. 7, or might utilize an architecture completely different than that shown in FIG. 7.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for dynamic network device storage allocation, the method comprising:
   receiving, at a software-defined networking (SDN) controller associated with a network and from a first agent of a first network device in the network, first availability data indicating a participation status in storage sharing for a category of data and a first amount of storage suggested by the first agent for the category on the first network device;
   receiving, at the SDN controller and from a second agent of a second network device in the network, second availability data indicating a second participation status in storage sharing for the category of data and a second amount of storage suggested by the second agent for the category on the second network device;
   determining, using at least the first availability data and the second availability data, network devices in the network having available storage space; and
   providing the first network device with an indication of the network devices.

2. The method of claim 1, wherein the first amount of storage suggested by the first agent is determined based on historical storage availability at the first network device.

3. The method of claim 1, further comprising obtaining, at the SDN controller, a network topology indicating locations of devices in the network.

4. The method of claim 3, wherein the indication of the network devices comprises a prioritized list of network devices based at least in part on the network topology.

5. The method of claim 1, further comprising:
   receiving updated first availability data from the first network device;
   determining, based at least in part on the updated first availability data, network devices in the network having available storage space; and
   providing the first network device with an updated indication of the network devices.

6. The method of claim 1, further comprising receiving capability data describing a type of file transfer protocol the first network device is configured to perform, and wherein the indication of the network devices comprises the capability data.

7. The method of claim 6, wherein providing the first network device with the indication of network devices comprises providing a subset of the network devices selected based at least in part on the capability data.

8. A system comprising:
   a network of one or more computing devices;
   one or more processors; and
   one or more non-transitory computer-readable media storing computer-executable instructions that, when executed by the one or more processors, cause the one or more processors to perform operations comprising:
      receiving, at a software-defined networking (SDN) controller associated with the network and from a first agent of a first network device in the network, first availability data indicating a participation status in storage sharing for a category of data and a first amount of storage suggested by the first agent for the category on the first network device;

receiving, at the SDN controller and from a second agent of a second network device in the network, second availability data indicating a second participation status in storage sharing for the category of data and a second amount of storage suggested by the second agent for the category on the second network device;

determining, using at least the first availability data and the second availability data, network devices in the network having available storage space; and providing the first network device with an indication of the network devices.

9. The system of claim 8, wherein the computer-executable instructions further cause the one or more processors to:
receive a network topology indicating locations of the one or more computing devices in the network.

10. The system of claim 9, wherein the indication of the network devices comprises a prioritized list of network devices based at least in part on the network topology.

11. The system of claim 8, wherein the computer-executable instructions further cause the one or more processors to:
receive updated first availability data from the first network device;
determine, based at least in part on the updated first availability data, network devices in the network having available storage space; and
provide the first network device with an updated indication of the network devices.

12. The system of claim 8, wherein the computer-executable instructions further cause the one or more processors to:
receive capability data describing a type of file transfer protocol the first network device is configured to perform, and wherein the indication of the network devices comprises the capability data.

13. The system of claim 12, wherein providing the first network device with the indication of network devices comprises providing a subset of the network devices selected based at least in part on the capability data.

14. The system of claim 8, wherein the computer-executable instructions further cause the one or more processors to:
receive credentials from the first network device, and wherein:
the indication of network devices comprises the credentials; and
the credentials enable access to storage space of the first network device.

15. A network device in communication with a network of computing devices, the network device comprising:
one or more processors; and
one or more non-transitory computer-readable media storing computer-readable instructions that, when executed by one or more processors, cause the one or more processors to:
receive, from a first agent of a first network device in the network, first availability data indicating a participation status in storage sharing for a category of data and a first amount of storage suggested by the first agent for the category on the first network device;
receive, from a second agent of a second network device in the network, second availability data indicating a second participation status in storage sharing for the category of data and a second amount of storage suggested by the second agent for the category on the second network device;
determine, using at least the first availability data and the second availability data, network devices in the network having available storage space; and
provide the first network device with an indication of the network devices.

16. The network device of claim 15, wherein the indication comprises a network topology indicating locations of the computing devices in the network.

17. The network device of claim 16, wherein conveying the data to the second network device is based at least in part on the network topology.

18. The network device of claim 15, wherein the computer-readable instructions further cause the one or more processors to:
convey credentials to a controller of the network, the credentials configured to enable storage by a remote computing device on a storage device of the network device.

19. The network device of claim 15, wherein the indication comprises credentials associated with the computing devices configured to enable the network device to access storage space on the computing devices in the network.

20. The network device of claim 15, wherein the computer-readable instructions further cause the one or more processors to:
convey capability data describing a type of file transfer protocol the network device is configured to perform, and wherein the indication comprises capability data associated with the computing devices of the network.

* * * * *